(12) United States Patent
Duplain et al.

(10) Patent No.: US 7,265,847 B2
(45) Date of Patent: Sep. 4, 2007

(54) BIREFRINGENT OPTICAL TEMPERATURE SENSOR AND METHOD

(75) Inventors: Gaetan Duplain, Beauport (CA); Richard Van Neste, Sainte-Foy (CA)

(73) Assignee: Opsens Inc., Québec (CA)

( * ) Notice: Subject to any disclaimer, the term of this patent is extended or adjusted under 35 U.S.C. 154(b) by 0 days.

(21) Appl. No.: 11/333,203

(22) Filed: Jan. 18, 2006

(65) Prior Publication Data
US 2007/0133004 A1 Jun. 14, 2007

Related U.S. Application Data

(63) Continuation of application No. PCT/CA2005/001815, filed on Nov. 29, 2005.

(60) Provisional application No. 60/631,416, filed on Nov. 30, 2004.

(51) Int. Cl.
*G01B 9/02* (2006.01)
(52) U.S. Cl. ........................ 356/479; 356/491
(58) Field of Classification Search ............... 356/477, 356/479, 491, 492, 496, 497; 374/130, 131, 374/161
See application file for complete search history.

(56) References Cited

U.S. PATENT DOCUMENTS

| | | |
|---|---|---|
| 4,140,393 A | 2/1979 | Cetas |
| 4,598,996 A | 7/1986 | Taniuchi |
| 4,814,604 A | 3/1989 | Lequime |
| 4,867,565 A | 9/1989 | Lequime |
| 5,255,068 A | 10/1993 | Emo et al. |
| 5,349,439 A * | 9/1994 | Graindorge et al. ........ 356/453 |
| 5,392,117 A | 2/1995 | Belleville et al. |
| 5,517,022 A * | 5/1996 | Bock et al. ................. 356/477 |
| 2006/0061768 A1* | 3/2006 | Duplain ...................... 356/479 |

FOREIGN PATENT DOCUMENTS

WO    WO 03/034007    4/2003

OTHER PUBLICATIONS

Duplain et al., "Absolute Fiber-Optic Linear Position and Displacement Sensor" published in OSA Technical Digest Series, vol. 16, 1997.
Mariller and Lequime, "Fiber-Optic White-Light birefringent temperature sensor" published in SPIE Proceedings, vol. 798, 1987.
Meldrum, "Sensor system exploits fibre's full potential" published in Design Engineering, Jul.-Aug. 1995.
Zavrsnik and Donlagia, "Fiber optic polarimetric thermometer using low extinction ratio polarizer and low coherence source" published in Proceedings of the 16th IEEE Instrumentation and Measurement Technology Conference, vol. 3, 1999.

* cited by examiner

*Primary Examiner*—Samuel A. Turner
(74) *Attorney, Agent, or Firm*—Ogilvy Renault, LLP

(57) ABSTRACT

The invention concerns a tandem interferometer for temperature sensing. The low coherence interferometry (LCI) system comprises a polarization-based sensing interferometer comprising a birefringent crystal having a sensor temperature sensitivity and a birefringence dispersion, and a readout interferometer being either a Fizeau interferometer using an optical wedge or a polarization interferometer using a birefringent wedge. In one embodiment of the invention, the birefringent crystal has dispersion properties similar to that of the birefringent wedge or that of the optical wedge of the readout interferometer. The present invention also provides a signal processing method for correcting the dispersion effect and for noise filtering in LCI-based optical sensors of the tandem interferometer arrangement.

28 Claims, 9 Drawing Sheets

BIREFRINGENT OPTICAL TEMPERATURE SENSOR AND METHOD

CROSS-REFERENCE TO RELATED APPLICATIONS

This application is a Continuation of Application of PCT/CA2005/001815, filed Nov. 29, 2005 and therefore claims priority of U.S. Application No. 60/631,416, filed Nov. 30, 2004 and entitled BIREFRINGENT OPTICAL TEMPERATURE SENSOR AND METHOD. These applications are incorporated by reference into the present application.

FIELD OF THE INVENTION

This invention relates to a birefringent optical sensor based on low-coherence interferometry (LCI) for measuring temperature.

BACKGROUND

Optical sensors, particularly fiber-optic sensors, are very attractive for the measurement of temperature in applications where immunity to electromagnetic interference, intrinsic safety and small size are required. Various optical methods have been proposed for temperature sensing. These methods can be classified by the specific properties of the light radiation (intensity, phase, polarization, and spectrum) to be modulated by the temperature. Among them, optical interferometry, which concerns the phase modulation of the light radiation, is recognized as one of the most sensitive method for optical temperature sensing by means of the temperature-induced changes of the interferometer path length difference. Although this method looks very attractive for temperature measurement, it may have severe restrictions if not properly applied. It is well known in the art that when using a narrowband light source, the coherence length of the light source is generally greater than the path length difference of the interferometer and therefore the measurement has a modulo $2\pi$ phase ambiguity, due to the periodic nature of the interferogram fringes. The modulo $2\pi$ phase ambiguity problem is avoided by using a light source with short coherence length. In this case, the fringes of the interferogram are narrowly localized into a path length difference region so the variation of the path length difference can be determined without the modulo $2\pi$ phase ambiguity by locating the fringe peak or the envelope peak of the interferogram. This type of interferometry is known as white-light or low-coherence interferometry (LCI).

LCI-based temperature optical sensor generally requires two interferometers usually connected with an optical fiber: 1) the sensing interferometer, which is subjected to the environmental temperature to be measured, and 2) the readout interferometer which is used to measure the temperature-induced changes of the path length difference of the sensing interferometer. This configuration is known in the art as the tandem interferometer arrangement.

A number of optical sensors for measuring temperature have been already proposed. U.S. Pat. No. 4,140,393 Cetas, February 1979 and U.S. Pat. No. 4,598,996 Taniuchi, July 1986 disclose the use of different birefringent crystals in a two-beam interferometer configuration as the sensing element for measuring temperature. They use crystals such as $LiTaO_3$, $LiNbO_3$, $BaTiO_3$ and $Sr_xBa_{1-x}Nb_2O_6$ (SBN) to form a polarization interferometer and they measure the light intensity at the output of this sensing interferometer which varies sinusoidally due to temperature-induced changes of the crystal birefringence. Their optical sensing system is based on narrow-band light source so their measuring technique suffers from a modulo $2\pi$ phase ambiguity and therefore offers a limited measurement range.

U.S. Pat. No. 5,255,068 Emo et al., October 1993 uses crystals and sensing interferometer arrangement similar to those of Cetas and Tanaiuchi for measuring temperature but their optical sensing system benefits from the short coherence length of the light source they use. However, the light source spectrum, modulated according to the temperature-dependent birefringence of the crystal, is recorded using a dispersive spectrometer which is known to have a low optical throughput. Since the resulted signal is obtained in the frequency or wavelength domain rather than in the time or spatial domain, they use a Discrete Fourier Transform signal processing method which can be time consuming without mentioning the cost and complexity of using a dispersive spectrometer configuration. Moreover, the above-mentioned crystals are known to have a strong frequency-dependence of their birefringence (birefringence dispersion) which can severely compromise their measurement method.

U.S. Pat. No. 5,392,117 Belleville et al., February, 1995 and the document by Duplain et al. "Absolute Fiber-Optic Linear Position and Displacement Sensor" published in OSA Technical Digest Series, Vol. 16, 1997 describe the use of a Fabry-Perot interferometer as a sensing interferometer for measuring various physical quantities including temperature and a readout interferometer, namely a Fizeau interferometer made of an optical wedge, to measure the measurand-induced changes of the path length difference of the sensing interferometer. Their LCI-based optical sensing system consists of recording the fringes of the interferogram at the output of a Fizeau readout interferometer using a linear photodetector array and to locate the fringe peak position on the interferogram. One advantage of using a Fizeau interferometer is related to its static nature, that is, with such a type of interferometer the interferogram is recorded in space rather than in time (as for dynamic interferometers) so none of the interferometer optical components are intended to move during a measurement. The Fizeau interferometer disclosed by Belleville et at and by Duplain et al may have material dispersion which can be detrimental to the localization of the fringe peak of the interferogram.

FISO technologies Inc. commercializes a Fabry-Perot sensing interferometer (FOT models) which uses a temperature transduction mechanism based on the thermal dilatation of one or both of optical glass fibers that form the mirror supports of the interferometer. Consequently, the temperature-induced changes of the path length difference rely on the mechanical properties rather than on the optical properties of the optical glass fibers. For those skilled in the art, it is known that amorphous glasses can suffer from hysteresis in thermal dilatation due to the inherent thermal expansion mismatch between the different materials that compose the interferometer. Thermal-creep is also a well known problem encountered with amorphous glasses and this may affect the long term accuracy of this type of sensor.

U.S. Pat. No. 4,814,604 and U.S. Pat. No. 4,867,565 issued to Lequime, as well as the document by Mariller and Lequime entitled "Fiber-Optic White-Light birefringent temperature sensor" published in SPIE Proceedings, Vol. 798, 1987, disclose the use of a LCI-based optical sensing device including a sensing interferometer for temperature measurement similar to the configuration disclosed in Cetas and Taniuchi patents. Their LCI-based optical sensing system consists of recording the fringe pattern at the output of a readout interferometer using a linear photodetector array (static interferometer configuration) or a single photodetector (dynamic interferometer configuration). Their polarization-based readout interferometer is a rather complex assembly of different birefringent elements placed in between two polarizers. The birefringent elements comprise, at least, a crystal plate with two elementary birefringent prisms stuck together along a face so to form a Wollaston or a modified-Wollaston prism. These birefringent elements are mounted in variant forms of the Babinet compensator and the Soleil compensator. These types of configurations produce complex assembly devices and suffer from important drawbacks. In it simplest configuration, the plane of localization of the fringes is inside the Wollaston prism and is inclined to the exit face of the Wollaston prism. This situation requires correction optics to form an image of the fringes onto the surface of the photodetector. However, the inclination of the plane of localization produces a residual focusing error at the surface of the photodetector and therefore leads to a reduction in the fringe contrast unless the light source has a high degree of spatial coherence. To prevent this situation, Lequime proposes some modifications in their initial configuration by using a second Wollaston prism and an achromatic halfwave plate, but at the expense of increasing the complexity of the device.

Due to the high birefringence dispersion of the crystal used in their sensing interferometer (and possibly in the readout interferometer) the interferogram can be severely distorted therefore compromising the localization of the envelope peak or the fringe peak. Mariller and Lequime propose two solutions to overcome this problem. One solution consists of using a readout interferometer made of same birefringent material to that of the sensing interferometer. Such solution is likely to increase the sensitivity of the readout interferometer to environmental temperature influences and therefore is not desired for industrial-based applications. A second solution proposed is the use of a light source with a narrower spectrum resulting into a reduction of the dispersion effects. This solution comes to the expense of widening the path length difference region of the fringes which inevitably reduces the accuracy of the envelope peak or the fringe peak location.

SUMMARY

It is an object of the invention to provide a simple optical temperature sensor system that overcomes at least some of the inconveniences of the prior art.

The invention provides an optical temperature sensing system comprising: a low-coherence interferometry (LCI) and polarization-based sensing interferometer comprising an optical temperature sensing component having a temperature-dependent birefringence for providing a path length difference sensitive to a temperature to be measured; and a readout interferometer optically coupled to said sensing interferometer and comprising at least one of a Fizeau interferometer made of an optical wedge and a polarization interferometer made of a birefringent wedge, said readout interferometer for providing a spatially distributed interferogram.

The invention also provides a method for optically sensing a temperature based on low coherence interferometry using a tandem interferometer setup and comprising: providing polarization-based sensing interferometer comprising an optical temperature sensing component having a temperature-dependent birefringence for providing a path length difference sensitive to a temperature to be measured; and a readout interferometer optically coupled to said sensing interferometer and comprising at least one of a Fizeau interferometer made of an optical wedge and a polarization interferometer made of a birefringent wedge, said readout interferometer for providing a spatially distributed interferogram; propagating a light in said sensing interferometer, said light having a coherence length smaller than said path length difference; measuring said interferogram; and calculating a temperature measurement using the measured interferogram.

The invention also provides a method for minimizing a dispersion effect in an interferogram produced by a low-coherence interferometry-based (LCI-based) tandem interferometer setup in an optical temperature sensing system, said tandem interferometer setup comprising a sensing interferometer having an optical temperature sensing component having a temperature-dependent birefringence for providing a path length difference sensitive to a temperature to be measured, and a birefringence dispersion hereinafter called a sensing dispersion; and a readout interferometer optically coupled to said sensing interferometer and having at least one of a Fizeau interferometer made of an optical wedge having a material dispersion and a polarization interferometer made of a birefringent wedge having a birefringence dispersion, said material dispersion or said birefringence dispersion of said birefringent wedge hereinafter called a readout dispersion, said readout interferometer for providing a spatially distributed interferogram, the method comprising: selecting a value of said readout dispersion to be similar to a value of said sensing dispersion.

The invention also provides a LCI-based tandem interferometer setup for temperature sensing comprising: a polarization-based sensing interferometer comprising an optical temperature sensing component having a temperature-dependent birefringence for providing a path length difference sensitive to a temperature to be measured; and a readout interferometer optically coupled to said sensing interferometer and comprising at least one of a Fizeau interferometer made of an optical wedge and a polarization interferometer made of a birefringent wedge, said readout interferometer for providing a spatially distributed interferogram.

The invention also provides an LCI-based optical temperature sensing system comprising: a polarization-based sensing interferometer comprising an optical temperature sensing component having a temperature-dependent birefringence for providing a path length difference sensitive to a temperature to be measured; and a readout interferometer optically coupled to said sensing interferometer and comprising at least one of a Fizeau interferometer made of an optical wedge and a polarization interferometer made of a birefringent wedge, said readout interferometer for providing a spatially distributed interferogram; a light source optically coupled to said sensing interferometer and for generating a light having a coherence length smaller than said path length difference; an optical detection system for measuring said interferogram; a signal processing unit for providing a temperature measurement using a measured interferogram.

The invention also provides a method for numerically compensating a dispersion effect in an interferogram produced by a LCI-based tandem interferometer setup in an optical temperature sensing system, said tandem interferometer comprising a sensing interferometer having an optical temperature sensing component having a birefringent dispersion and a temperature-dependent birefringence for providing a path length difference sensitive to a temperature to be measured; a readout interferometer optically coupled to said sensing interferometer and having at least one of a Fizeau interferometer made of an optical wedge and a polarization interferometer made of a birefringent wedge having a readout dispersions said readout interferometer for providing a spatially distributed interferogram; and an unbalanced dispersion resulting from a difference between said birefringent dispersion and said readout dispersion, the method comprising: measuring said interferogram to provide an interferogram signal; calculating a temperature measurement using the measured interferogram, said calculating comprising numerically compensating said unbalanced dispersion.

The invention also provides a temperature sensing interferometer made of a temperature-sensitive birefringent material having similar dispersion properties to that of the birefringent wedge (polarization interferometer) or that of the optical wedge (Fizeau interferometer) of the readout interferometer.

The present invention also provides a signal processing method for correcting the dispersion effect and for noise filtering in LCI-based optical sensors of the tandem interferometer arrangement.

The invention concerns a LCI-based tandem interferometer setup for temperature sensing. The LCI-based tandem interferometer setup system comprises a polarization-based sensing interferometer comprising a birefringent crystal having a sensor temperature sensitivity and a birefringence dispersion, and a readout interferometer being either a Fizeau interferometer using an optical wedge or a polarization interferometer using a birefringent wedge. In one embodiment of the invention, the birefringent crystal has dispersion properties similar to that of the birefringent wedge or that of the optical wedge of the readout interferometer. The present invention also provides a signal processing method for correcting the dispersion effect and for noise filtering in LCI-based optical sensors of the tandem interferometer arrangement.

DESCRIPTION OF THE DRAWINGS

In order that the invention may be readily understood, embodiments of the invention are illustrated by way of example in the accompanying drawings.

DETAILED DESCRIPTION

Figure 1:
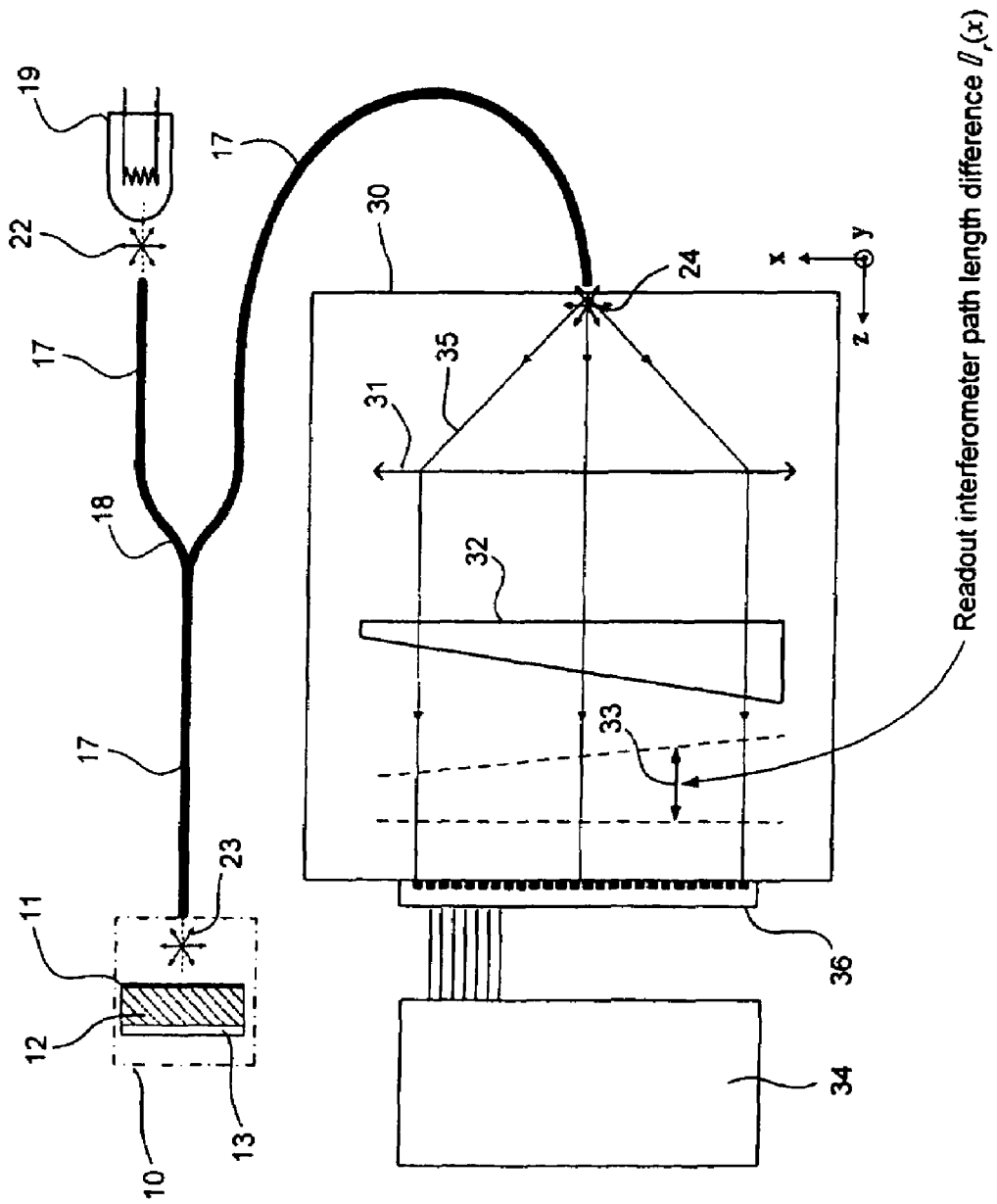
FIG. 1 is a schematic view of a birefringent optical temperature sensor in the tandem interferometer arrangement, with a polarization-based sensing interferometer mounted in reflective configuration.

There are two basic configurations for the tandem interferometer optical sensor arrangement, which are the reflective and transmissive configurations. The optical sensor of the reflective configuration showed in FIG. 1 comprises a polarization-based sensing interferometer 10 operated in reflection mode. The polarization-based sensing interferometer 10 consists of a linear polarizer 11 located at the input face of an optical temperature sensing component 12 and a mirror 13 located at the end face of the sensing component 12. In this case, the sensing component is birefringent crystal. The birefringence of the crystal varies as a function of the temperature therefore providing a sensing interferometer having a path length difference sensitive to the environmental temperature. A set of optical fibers 17 and an optical coupler 18 connect the sensing interferometer 10 to a light source 19, such as a filament or an electroluminescent diode, and to a readout interferometer unit 30. Light 22 emitted by the light source is sent, by means of the optical coupler 18 and the optical fibers 17, toward the sensing interferometer 10. Assuming a stationary optical field with a high degree of spatial coherence at the input of the sensing interferometer, the power spectral density $I_s(\nu)$ at the output of the sensing interferometer is spectrally modulated in accordance with the spectral interference law and is given by the following equation:

$$I_s(\nu) = K_s I_{in}(\nu)[1 + \cos(2\pi\nu\tau_s + \theta_s)] \quad (1)$$

$$= K_s I_{in}(\nu)\left[1 + \cos\left(2\pi\nu\frac{\delta_s}{c} + \theta_s\right)\right]$$

where $\nu$ is the frequency of the light, $\tau_s$ and $\delta_s$ ($\delta_s = c\,\tau_s$) are respectively the relative time delay and the path length difference of the sensing interferometer 10 which vary as a function of the temperature, c is the speed of light in vacuo, $I_{in}(\nu)$ is the power spectral density of the light flux 23 at the input of the sensing interferometer 10, $K_s$ and $\theta_s$ are numerical constants that depend on the sensing interferometer configuration.

The temperature dependence of the sensing interferometer path length difference $\delta_s$ is explicitly given by the following equation:

$$\delta_s(T) = \begin{cases} 2 \cdot B_s(T) \cdot d_s & \text{reflective configuration} \\ B_s(T) \cdot d_s & \text{transmissive configuration} \end{cases} \quad (2)$$

where $B_s$ and $d_s$ are respectively the temperature-dependent birefringence and the thickness of the crystal and T is the temperature. It is noted that the temperature dependence of the crystal thickness has been omitted in the above equation since its contribution to the sensor response is generally much lower than that of the crystal birefringence.

The light flux 23 at the output of the sensing interferometer is collected by the same optical fiber 17 and is sent toward the readout interferometer unit 30. The light flux 24 exiting the optical fiber 17 is fed into the readout interferometer 32 using focusing optics 31. The readout interferometer 32 is either a Fizeau interferometer made of an optical wedge or a polarization interferometer made of a birefringent wedge stacked in between two polarizers. These kinds of static interferometers provide a spatially distributed path length difference 33 variation along a direction (x direction on FIG. 1). The light beam 35 goes through the readout interferometer 32 and is detected using an optical detection system 36, which in this case is a photodetector array as, for instance, a linear charge couple device (CCD) or a photodiode array. A signal processing unit 34 analyses the spatially distributed interferogram obtained from the light intensity distribution measured by the photodetector array 36 and determines the envelope peak location or the fringe peak location of the interferogram and converts this location into a path length difference of the sensing interferometer 10 and accordingly into the temperature value.

Figure 2:
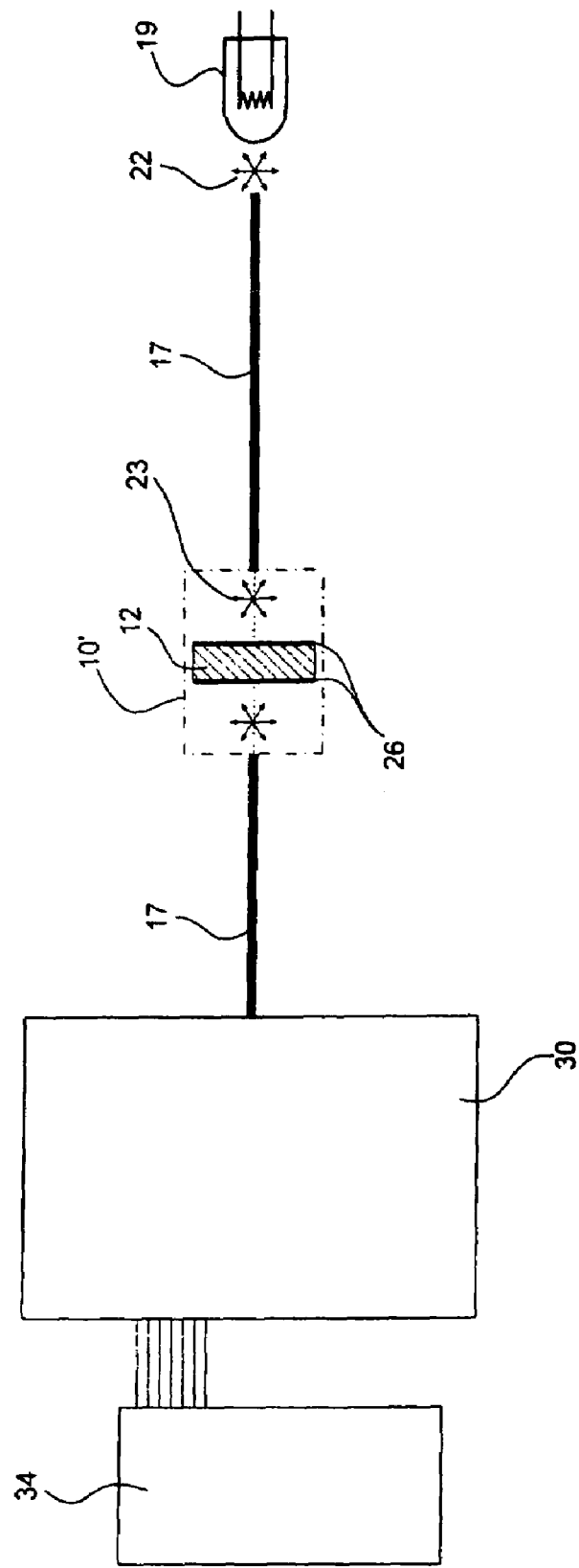
FIG. 2 is a schematic view of a birefringent optical temperature sensor with a polarization-based sensing interferometer operated in transmissive configuration.

FIG. 2 depicts the optical sensor transmissive configuration. It comprises a polarization-based sensing interferometer 10 operated in transmission mode. The polarization interferometer consists of a birefringent crystal element 12 stacked in between two linear polarizers 26. The birefringence of the crystal varies as a function of the temperature therefore providing a sensing interferometer having a path length difference sensitive to the environmental temperature.

Figure 3:
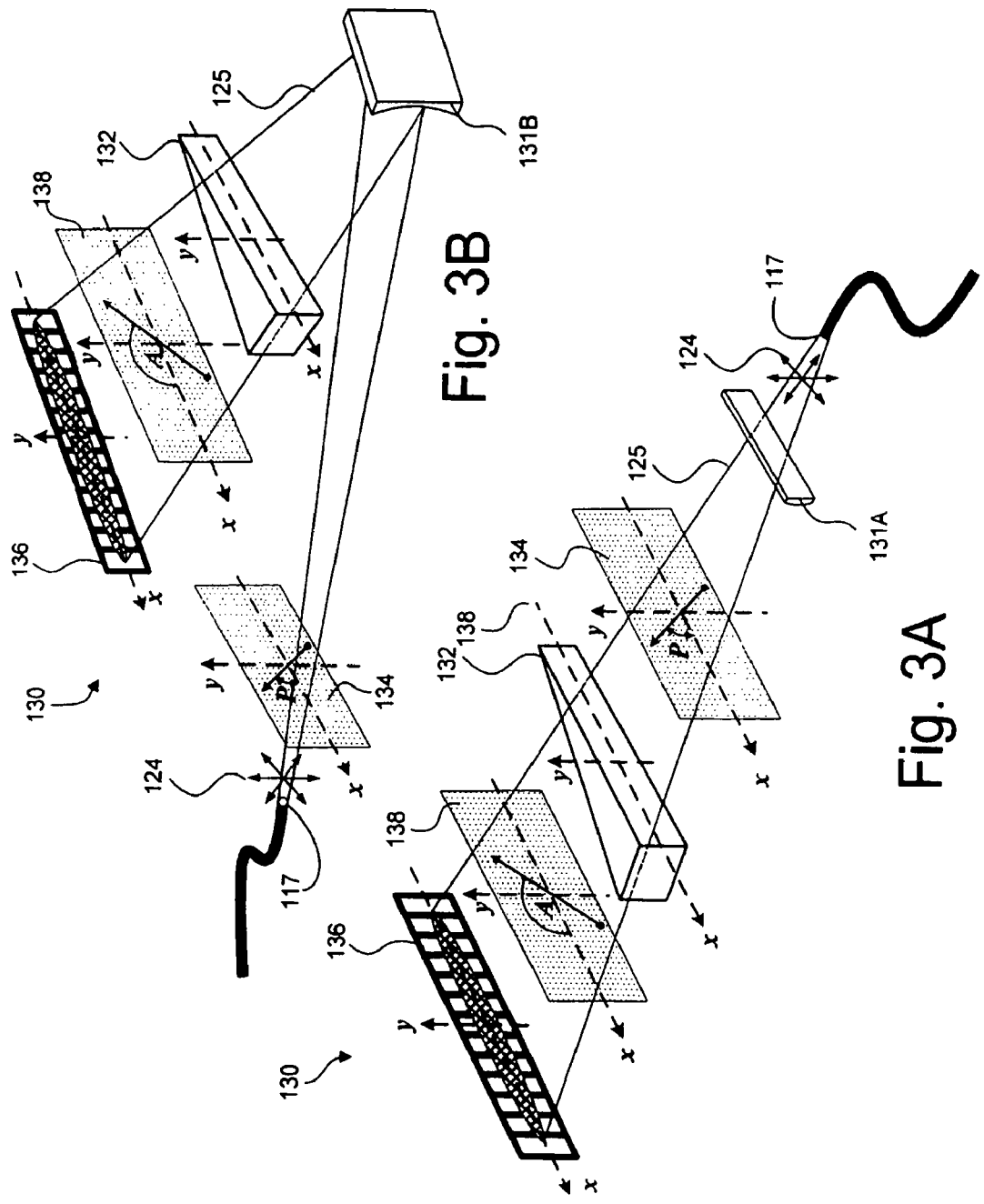
FIG. 3A is a schematic view of a polarization-based readout interferometer, offered as an alternative to the readout interferometer of FIG. 1 and using a cylindrical lens.
FIGS. 3B is a schematic view of a polarization-based readout interferometer, offered as an alternative to the readout interferometer of FIG. 1 and using a cylindrical mirror.

FIGS. 3A and 3B illustrate a polarization-based readout interferometer unit 130. In an embodiment of the invention, the light at the output of the sensing interferometer (not shown) is collected by the optical fiber 117 and is sent toward the readout interferometer 130. The light flux 124 exiting the optical fiber 117 is fed into the readout interferometer unit 130 using focusing optics 131. The readout interferometer unit 130 is a static polarization interferometer based on the two-beam interferometer configuration, having a spatially distributed path length difference variation along a direction, and comprising a single wedge 132 made of a birefringent crystal, a linear polarizer 134 placed in front of the birefringent wedge 132, that decomposes unpolarized light into two orthogonal linear polarization components, and a linear analyzer 138 placed behind the birefringent wedge 132, with a polarization axis oriented parallel or perpendicular to the polarization axis of the polarizer 134, that recombines the two orthogonal linear polarization components of the transmitted light at the output of the birefringent wedge 132 so they can interfere. A light beam 125 goes through the readout interferometer and reaches the surface of the photodetector array 136.

The focusing optics 131a, 131b is a simple anamorphic imaging system made of a single cylindrical lens 131a or a cylindrical mirror 131b. It projects an image of the exit face of the optical fiber 117 onto the surface of the photodetector array but in the vertical direction only (y direction on the figure). In the other direction, the light beam is spread over the length of the array by making use of the divergence of the light beam that exit the optical fiber. It is preferable to have the birefringent wedge 132, the linear analyzer 138 and the photodetector array 136 close to each other but further away from the input optical fiber (not explicitly shown on FIGS. 3A and 3B). Under this condition and by limiting the angle of the birefringent wedge to small values (as it will be discussed subsequently), the splitting of the light beam at the photodetector surface and due to double refraction in the birefringent wedge is kept very small and does not significantly reduces the visibility of the fringes. Another advantage of this configuration is that the size of the light beam at the input of the readout interferometer 12 is rather small compared to its distance from the birefringent wedge 132 so the input light beam can be seen as a good approximation of a point source, at least in the x direction. It is well know from the theory of interference that the fringes are not localized with a point source and therefore the visibility of the fringes is not affected by the double refraction effect in the wedge. For those skilled in the art, it is obvious that there are pluralities of different anamorphic imaging systems different than the two described here which can be used in the readout interferometer unit 130.

Figure 4:
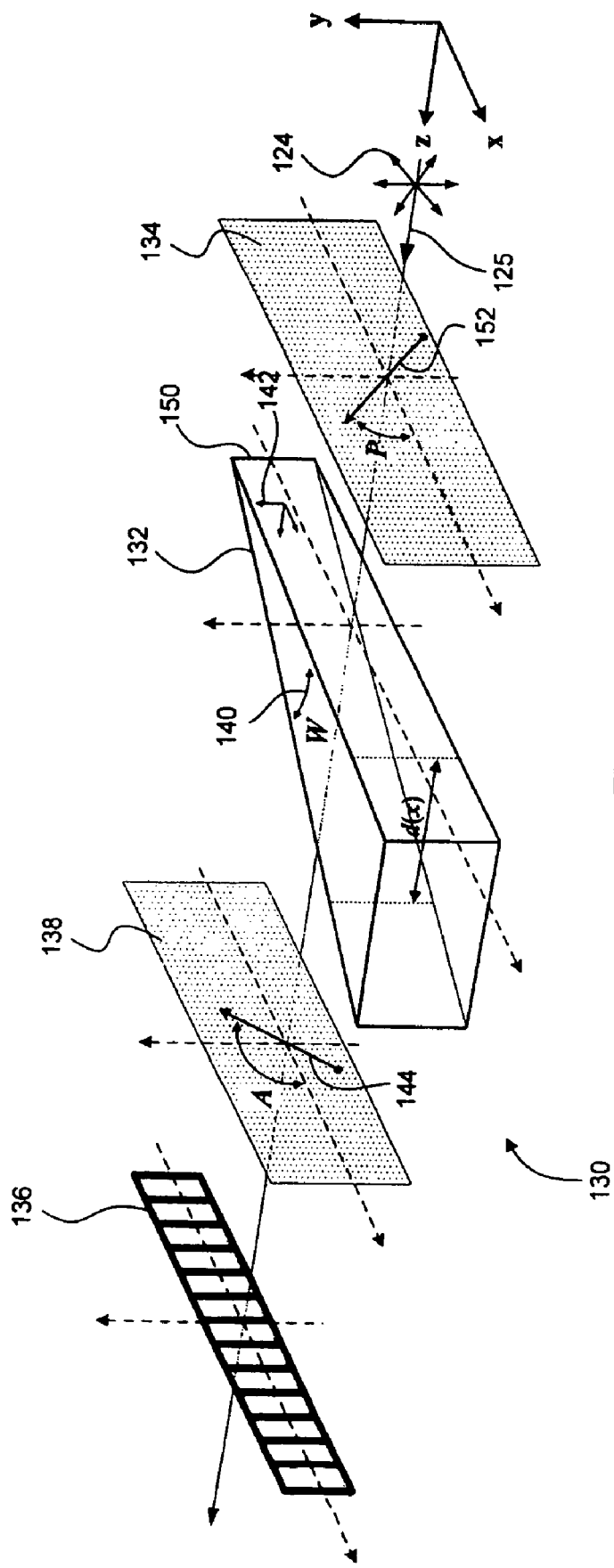
FIG. 4 is a partial schematic view of the readout interferometer of FIG. 3A.

FIG. 4 shows a diagram of an embodiment of the readout interferometer unit 130. For ease of comprehension, the wedge is orientated such that its first surface lies parallel to the x-y plane and its edge lies parallel to the y axis of the figure. The thickness d(x) of the wedge 132 varies as a linear function of the position on the x axis as follows:

$$d(x) = x \tan(W) + d_0 \quad (3)$$

where W is the wedge angle 140 and $d_o$ is the thickness of the wedge at the position x=0. The wedge 132 is made of a crystal which exhibits optical anisotropy; that is the velocity of the light through the crystal depends upon the direction of propagation and the direction of vibration. In an embodiment, the crystal of the wedge has one of its principal sections parallel to the front surface of the wedge 132 and has one of the principal vibrating axes 142 of that principal section perpendicular to the edge 150 of the wedge 132. With such orientation, the principal vibrating axes and hence the principal indices of the birefringent crystal correspond to the x, y and z axes of FIG. 4. The wedge 132 is preferably made of a uniaxial crystal with principal refractive indices $n_e$ and $n_o$. Without loss of generality, the refractive indices in the x and y direction are arbitrarily selected as $n_x \equiv n_e$ and $n_y = n_z \equiv n_o$, so the birefringence of the crystal is $B \equiv (n_e - n_o) = (n_x - n_y)$.

The linear polarizer 134 has its transmission axis 152 preferably orientated at an angle P=±45 degrees with respect to the aforementioned principal vibrating axis which correspond to the x axis of the figure. The linear analyzer 138 has its transmission axis 144 preferably orientated parallel or perpendicular to the transmission axis 152 of the polarizer 134, so its orientation angle is preferably A=P or A=P±90 degrees.

Light flux 124 received from the sensing interferometer (not shown) is fed into the readout interferometer unit 130 and is linearly polarized at angle P with respect to x axis. Once entering the front face of the birefringent wedge, the linearly polarized light decomposes into x and y orthogonal polarization components that propagate with different phase velocities due to difference in refractive indices $n_e$ and $n_o$. Considering only normally incident light, the path length difference $\delta_r$ and accordingly the relative time delay $\tau_r$ between the two orthogonal x and y components at the back surface of the wedge is given by the following equation:

$$\delta_r = c\tau_r = Bd(x) = (n_e - n_o)[x\tan(W) + d_0] \quad (4)$$

which shows the linear dependence of $\delta_r$ (and $\tau_r$) with the position x. One can appreciate the fact that given a wedge thickness error $\Delta d$ due to the inherent limitations in the optical manufacturing tolerances, the corresponding relative path length difference error $\Delta\delta$ is equal to B $\Delta d$, while that of a Fizeau interferometer is equal to 2 $\Delta d$. In practice it means that, given an acceptable limit of the path length difference error, the imposed thickness tolerance limit for the birefringent wedge is about two orders of magnitude larger than that of the wedge of a Fizeau interferometer. Therefore, the birefringent wedge is much easier to produce than the Fizeau wedge. The same is true if we compare the manufacturing tolerance of the birefringent wedge angle to that of the Fizeau wedge.

Figure 5:
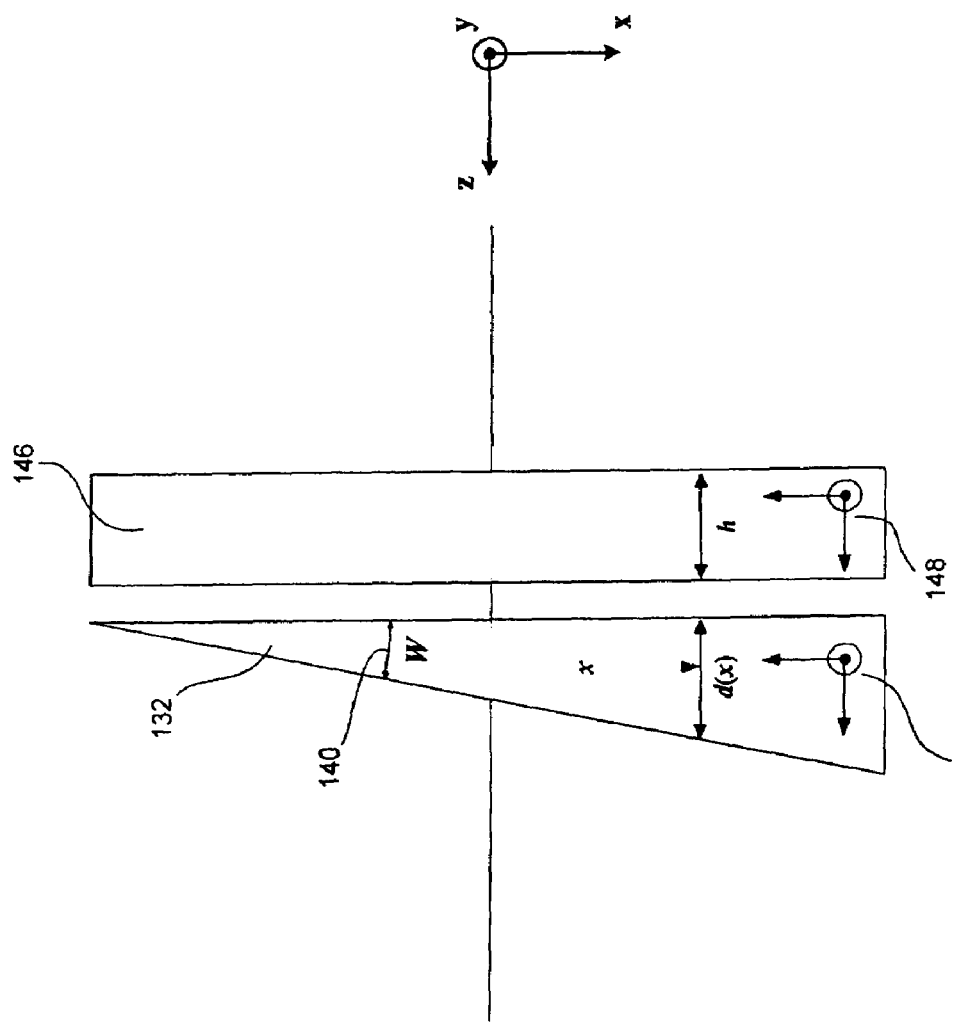
FIG. 5 is a partial schematic view of a polarization-based readout interferometer in accordance with an alternate embodiment, the readout interferometer comprising a birefringent plate positioned in front of the birefringent wedge.

FIG. 5 shows another embodiment for the birefringent wedge. A birefringent plate 146 of thickness h, preferably made of the same crystal material as the wedge 132, is positioned in front or behind the birefringent wedge 132. This birefringent plate 146 is used to increase or decrease the midpoint of the path length difference operating range of the readout interferometer. The crystal of the plate is orientated to have two of its three principal vibrating axes 148 parallel to the surface of the plate. In the case where the plate 146 is made of a uniaxial crystal, its x and y principal vibrating axes, as previously defined are parallel to the surface of the plate and their orientation in that plane may be adjusted to two positions: one at same orientation and one at crossed orientation with respect to the crystal principal vibrating axes of the birefringent wedge 132. In the case where the plate 146 and the wedge 132 are made of the same uniaxial crystal, the path length difference of the readout interferometer is:

$$\delta_r = c\tau_r \quad (5)$$

$$= \begin{cases} B(d(x) + h) = (n_e - n_o)\left[\begin{array}{c} x\tan(W) + \\ (d_0 + h) \end{array}\right] & \text{for parallel orientation} \\ B(d(x) - h) = (n_e - n_o)\left[\begin{array}{c} x\tan(W) + \\ (d_0 - h) \end{array}\right] & \text{for crossed orientation} \end{cases}$$

The above equation shows that adding a birefringent plate of thickness h provide a simples means to increase or decrease the midpoint of the path length difference operating range without having to use a different wedge. The birefringent plate 146 may be bonded directly to the birefringent wedge 132 or it may be separated from it so it can be easily removed or changed.

Different variants of the reflective and transmissive configurations described in FIG. 1 and in FIG. 2 exist (such as the use of focusing optics in the polarization interferometer) and are not given here as they are evident for those skilled in the art.

Assuming that the coherence length of the light source is much smaller than the path length difference of the sensing interferometer 10', the oscillatory component of the interference pattern (referred to as an interferogram) recorded by the photodetector array at the output of the readout interferometer representing the light intensity distribution $I_r(\delta_r)$ versus the path length difference $\delta_r$ of the readout interferometer, can be expressed by the following formula derived from the general interference law for stationary optical fields (see L. Mandel and E. Wolf, Optical coherence and quantum optics, Cambridge University Press, 1995, pages 159-170):

$$I_r(\delta_r) \propto \text{Re}\{\gamma_{12}(\delta_r - \delta_s)\} \quad (6)$$

where $\gamma_{12}(\delta_r - \delta_s)$ is a shifted version of the complex degree of mutual coherence function, Re{ } denotes the real part of the complex quantity $\gamma_{12}$. With the use of the following general forms for $\gamma_{12}$ $$\gamma_{12}(\delta_r - \delta_s) = |\gamma_{12}(\delta_r - \delta_s)|\exp\left(i\left[\alpha_{12} - 2\pi v_o\left(\frac{\delta_r - \delta_s}{c}\right)\right]\right) \quad (7)$$

where $\alpha_{12} \equiv 2\pi v_o\left(\frac{\delta_r - \delta_s}{c}\right) + \arg\{\gamma_{12}(\delta_r - \delta_s)\}$ Equation (6) can be re-written in a somewhat more explicit form:

$$I_r(\delta_r) \propto |\gamma_{12}(\delta_r - \delta_s)|\cos\left[2\pi v_o\left(\frac{\delta_r - \delta_s}{c}\right) - \alpha_{12}(\delta_r - \delta_s)\right] \quad (8)$$

where $v_o$ is the mean frequency of the effective light source, $\delta_s$ is the path length difference of the sensing interferometer as given by Equation (2), | | denotes the complex modulus and arg{ } the complex argument of the complex value $\gamma_{12}$. Equation (8) shows that the fringes of the interferogram at the output of the readout interferometer unit 32 is an amplitude-modulated signal with a cosine carrier of frequency $v_o$, a phase function $\alpha$ and an envelope function $|\gamma|$. The envelope function is generally called the visibility envelope function or the coherence envelope function which is a measure of the fringe visibility of the interferogram.

Proceeding on the stationary optical fields assumption and according to the Wiener-Khintchine theorem we get $$\gamma_{12}(\delta_r - \delta_s) = \int_{-\infty}^{\infty} P(v)e^{i2\pi v\left(\frac{\delta_s}{c}\right)}e^{-i2\pi v\left(\frac{\delta_r}{c}\right)}dv \quad (9)$$

where $P(v)$ is the normalized power spectral density of the effective light source which includes the spectral characteristic of the photodetector sensitivity and the spectral characteristic of the transmission losses and reflection losses of the optical sensor components. Equation (9) shows that the shifted version of the complex degree of mutual coherence function $\gamma 12$ forms with the complex spectrum $P(v)$ $\exp\{i2\pi\delta_s/c\}$ a Fourier transform pair. Therefore, the envelope and the phase of the interferogram fringes depend upon the spectrum of the light source and the path length difference of the sensing interferometer. In practice we observe that $\alpha$ and $|\gamma|$ are slowly varying functions of the path length difference compared with the cosine carrier.

Figure 6:
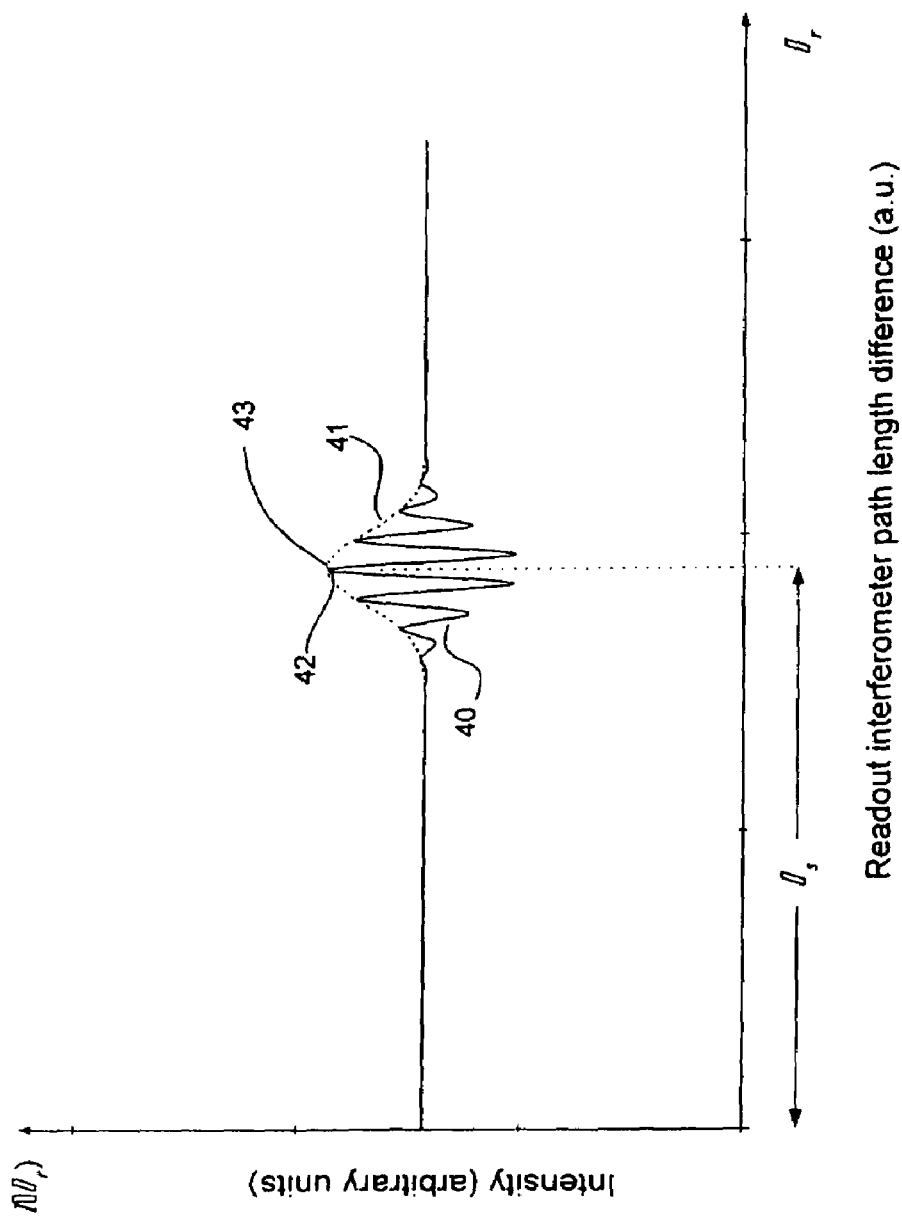
FIG. 6 is a graph showing a typical interferogram signal from a LCI-based optical sensing system when there is no dispersive component in the readout and in the sensing interferometer.

FIG. 6 shows a typical interferogram obtained at the output of the readout interferometer 32 when there are no dispersive components in the sensing and readout interferometers. The solid curve 40 represents the measured interferogram signal while the dashed curves 41 represent the envelope of the interferogram. The common practice of the LCI technique can be simply stated as to find the location of the peak of the interferogram signal. When the dispersion effects can be neglected, the location of the fringe peak 42 or that of the envelope peak 43 of the interferogram signal provide an unambiguous value of the path length difference of the sensing interferometer $\delta_s$ and so on the value of the measurand. It is noted that, compared to the fringe function, the envelope is a slowly varying function of the path length difference and therefore the fringe peak location is generally a more sensitive detection method than the envelope peak method.

In practice, it is difficult, if not impossible, to avoid dispersion effects—this is especially the case with the polarization-based sensing interferometer using a birefringent crystal. It is found that the birefringence of optical crystals varies more or less with the frequency of the light. When the sensing (and/or the readout) interferometer contains dispersive media, the path length difference is no longer constant with respect to the frequency. High order dispersion can produce significant and asymmetrical broadening of the interferogram envelope, diminution of the envelope visibility and a relative offset between the envelope peak and the fringe peak. If not properly compensated for, these dispersion effects can severely reduce the accuracy of the fringe peak or the envelope peak detection methods.

A dispersion compensation method has been suggested in the prior art which consists in the use of a readout interferometer unit 30 made of the same material as the sensing interferometer 10. However, as we mentioned earlier, this configuration is not desirable. A better configuration for dispersion compensation is to use a low temperature sensitivity birefringent material in the readout interferometer unit 30 that has similar dispersion terms (i.e. linear and higher order dispersion terms) to those of the sensing interferometer 10. For example, a magnesium fluoride ($MgF_2$) crystal can be used in a polarization-based readout interferometer along with a Lithium Triborate ($LiB_3O_5$) crystal in a polarization-based temperature sensing interferometer. The MgF2 crystal has birefringence dispersion similar to that of the $LiB_3O_5$ crystal but the temperature sensitivity of its birefringence is much lower. It is possible to produce similar dispersion compensation with a Fizeau readout interferometer. In this case the material of the Fizeau wedge is selected to have its refractive index dispersion similar to the birefringence dispersion of the polarization-based sensing interferometer to compensate for it.

In practice, the aforementioned dispersion compensation method based on appropriate material selection for the sensing and readout interferometers is limited to materials or to crystals with moderate dispersion. The use of highly dispersive materials or crystals requires a close match between the dispersion within the readout interferometer and the dispersion within the sensing interferometer. An exhaustive literature survey on the properties of optical crystals shows that the crystals with the highest temperature dependence of birefringence also have a high frequency-dependence of birefringence. In this case, it is difficult, if not impossible, to find a crystal or a material for the readout interferometer that closely matches the dispersion characteristic of these temperature sensitive crystals and that has low temperature sensitivity.

To compare the temperature sensitivity of the different crystals available for temperature sensing, we define a normalized temperature coefficient $\chi$ for the temperature dependence $\partial \delta_s/\partial T$ of the path length difference of the temperature sensing interferometer:

$$\chi \equiv \left| \frac{1}{\delta_s} \frac{\partial \delta_s}{\partial T} \right| \cong \left| \frac{1}{B} \frac{\partial B}{\partial T} \right| \quad (10)$$

where $\partial B/\partial T$ is the temperature dependence of the crystal birefringence.

Table 1 gives the normalized temperature coefficient value of the crystals reported in the prior art (line no 1 to 5) for temperature sensing and also of the KNSBN (Potassium Sodium Strontium Barium Niobate) crystal.

TABLE 1

| | Property given at room temperature and at 800 nm wavelength region | |
|---|---|---|
| | Crystal | $\chi$ |
| 1 | $LiTaO_3$ | $7.3 \times 10^{-3}/°$ C. |
| 2 | SBN | $4.1 \times 10^{-3}/°$ C. |
| 3 | $BaTiO_3$ | $2.8 \times 10^{-3}/°$ C. |
| 4 | $LiNbO_3$ | $0.5 \times 10^{-3}/°$ C. |
| 5 | $LiB_3O_5$ (x-cut) | $0.5 \times 10^{-3}/°$ C. |
| 6 | KNSBN | $6.3 \times 10^{-3}/°$ C. |

Figure 7:
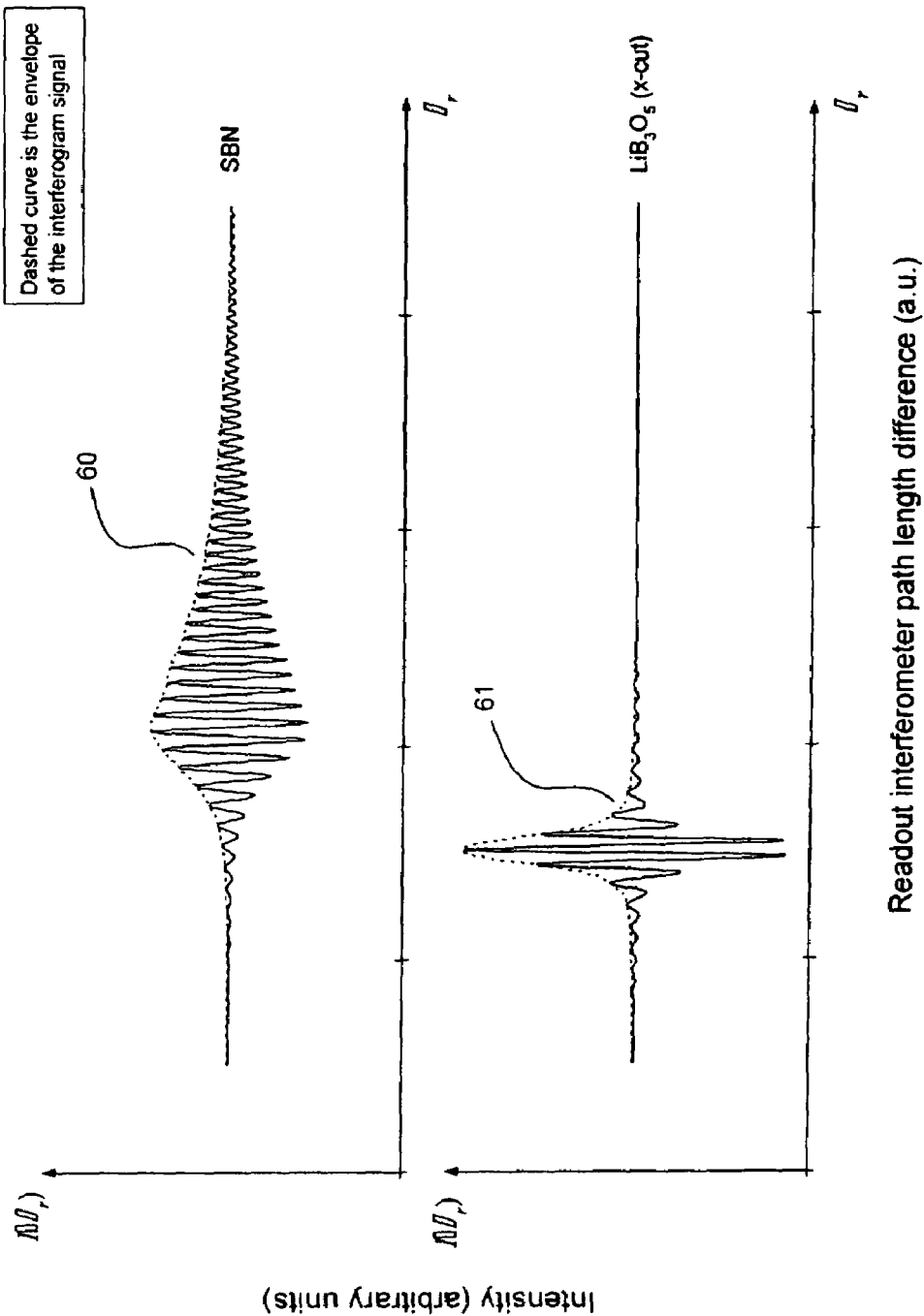
FIG. 7 is a graph showing two interferogram signals obtained with a polarization-based readout interferometer made of $MgF_2$ crystal wedge. The bottom curve of the graph is the interferogram signal from a polarization-based sensing interferometer made of a $LiB_3O_5$ x-cut crystal. The top curve of the graph is the interferogram signal from a polarization-based sensing interferometer made of a SBN crystal.

It can be shown that the crystals of Table 1 having the highest temperature sensitivity have also the highest dispersion of the birefringence. Graph curve 60 of FIG. 7 shows the calculated interferogram signal for a polarization-based temperature sensing interferometer made of a SBN (Strontium Barium Niobate) crystal used with a polarization readout interferometer made of an MgF2 crystal wedge. In comparison, graph curve 61 shows the same but for a $LiB_3O_5$ x-cut crystal instead of the SBN crystal. The dispersion effects of the SBN crystal are clearly seen in this figure. The strong dispersive imbalance of the path length difference in the sensing interferometer, which is not compensated by the readout interferometer, produces a significant asymmetrical broadening of the interferogram signal and a reduction of the envelope visibility. It is also seen (not directly shown on the figure) that the location of the fringe peak relative to the envelope peak is no longer constant; that is, the fringes appear to move slower than the envelope while the path length difference of the sensing interferometer varies. Therefore in the case of strong dispersive imbalance, the localization of the fringe peak or that of the envelope peak can be seriously compromised.

It clearly follows from the above that the use of high temperature sensitivity crystals in a LCI-based optical sensing system requires a dispersion compensation method. As shown below, the dispersion can be compensated numerically.

In the case where dispersion cannot be neglected, Equation (9) can be reformulated in a more general form:

$$\gamma_{12} = \int_{-\infty}^{\infty} P(v) e^{i\phi(v)} e^{-i2\pi v \left(\frac{\delta_r}{c}\right)} dv \quad (11)$$

where $\phi(v)$ is the dispersive phase function. For simplicity of discussion but without loss of generality, we assume that the dispersion is present in the birefringent crystal of the sensing interferometer only. In this case we can write $$\phi(v) = 2\pi v \frac{\delta_s}{c} = 2\pi v \frac{B_s(v) \cdot d_s}{c} \quad (12)$$

Equation (12) can be expressed in terms of a Taylor series expansion about a mean frequency $v_0$:

$$\phi(v) \approx \phi(v_0) + (v - v_0)\frac{d\phi}{dv}\bigg|_{v_0} + \frac{(v-v_0)^2}{2}\frac{d^2\phi}{dv^2}\bigg|_{v_0} + \ldots \quad (13)$$

and therefore it follow from Equation (12)

$$\phi(v) \approx \frac{2\pi d}{c}\left[v_0 B_s(v_0) + (v-v_0)G_s(v_0) + \frac{(v-v_0)^2}{2}\frac{dG_s}{dv}\bigg|_{v_0} + \ldots\right] \quad (14)$$

$$\approx v_0 \tau_s(v_0) + (v-v_0)g_s(v_0) + \frac{(v-v_0)^2}{2}\frac{dg_s}{dv}\bigg|_{v_0} + \ldots$$

where $G_s$ and $g_s$ are known as the group birefringence and the group delay respectively and are given by:

$$G_s(v) = B_s(v) + v\frac{dB_s}{dv} \quad (15)$$

$$g_s(v) = \tau_s(v) + v\frac{d\tau_s}{dv}$$

If we consider the first two terms of Equation (14) only then Equation (8), re-expressed as a function of the relative path delay $\tau_s$, can be reformulated as follows:

$$I_r(\tau_r) \propto |\gamma_{12}(\tau_r - g_s(v_0))|\cos\left[2\pi v_o(\tau_r - \tau_s(v_0)) - \alpha_{12}(\tau_r - g_s(v_0))\right] \quad (16)$$

which shows that the relative position between the envelope peak and the fringe peak is no longer constant and changes as the path length difference is varied. Equation (16) also shows that in such moderate dispersion condition the shape of the envelope is preserved while the path length difference varies. If higher dispersion terms of Equation (14) are taken into account, then the shape of the envelope is no longer constant and it gets distorted as the path length difference of the sensing interferometer is increased (see FIG. 7).

Using the linearity property of the Fourier Transform, we obtain the following relation between $\phi(v)$ and the oscillatory component of the interferogram signal $$\phi(v) = \arg[F\{I_r(\delta_r)\}] \quad (17)$$

where $F\{\ \}$ is the Fourier Transform (FT). Thus the value of the phase function can be known from the argument of the Fourier Transform of the measured interferogram signal. It is therefore possible to numerically compensate the dispersion effect by applying a phase-correction function $\psi(v)$ on the FT of the measured interferogram signal.

The phase correction function can be calculated from each interferogram signal acquired during the measurement sequence or it can be determined in advance if the second and higher order dispersion terms in Equation (14) can be assumed to remain fairly constant over the measured temperature range. The later procedure has the advantage to reduce the computing steps of the signal processing during a measurement sequence. This assumption is verified with the KNSBN crystal—the temperature-induced variation of the KNSBN birefringence is mainly due to the constant and linear terms (first two terms) in Equation (14).

The phase-correction function can be obtained as follow:

1—Obtain a sampled interferogram signal from the crystal of interest as described in the present invention, 2—Take the Discrete Fourier Transform (FFT method) of the interferogram sampled signal resulting from Step 1, 3—Calculate the discrete phase function $\phi(v_i)$ using Equation (17) and the signal resulting from Step 2. At this step the discrete phase function is obtained module $2\pi$, so $\phi(v_i)$ is then unwrapped by using one of the well known phase-unwrapping methods, 4—Perform a polynomial fit on the unwrapped $\phi(v_i)$ data resulting from Step 3 in the frequency range of interest, that is around $v_0$ where the energy spectrum of the interferogram signal is concentrated, 5—Calculate the phase slope $d\phi/dv$ at $v_0$ by taking the first derivative of the fitted polynomial resulting from Step 4, 6—Construct the discrete phase-correction function $\psi(v_i)$ as follow:

$$\psi(v_i) = \phi(v_i) - \left((v_i - v_0)\frac{d\phi}{dv}\bigg|_{v_0} + \phi(v_0)\right) \quad (18)$$

Once the discrete phase-correction function is known it can be implemented into various kinds of digital signal processing methods that are used for retrieving the position of the fringe peak or that of the envelope peak. As an example, the following signal processing method in the frequency domain can be used for dispersion compensation:

1—Take the Discrete Fourier Transform of the interferogram sampled signal. This can be efficiently done using the FFT method;

2—Make all negative frequency components and the zero frequency component of the DFT signal resulting from Step 1 equal to zero and apply a suitable bandpass filter to the remaining positive frequency component;

3—Apply the phase-correction filter by multiplying each positive frequency component of the DFT signal resulting from Step 2 by $\exp\{-i\,\psi(v_i)\}$ (Note: Step 2 and 3 can be performed in one step by combining these two filters into a single complex filter);

4—Take the Inverse Discrete Fourier Transform (IFFT method) of the DFT signal resulting from Step 3. At this point, the processed discrete signal is an analytic signal because its negative frequency components have been removed;

5—Extract the envelope signal and the fringe signal of the analytic signal resulting from Step 3. Signal Theory show that the envelope of this band-limited analytic signal is obtained by taking its complex modulus and the fringe signal is obtained by taking the real part of the said analytic signal;

6—Retrieve from the envelope signal (or the fringe signal) resulting from Step 5 the position value of the envelope peak position (or the fringe peak position). The envelope peak or the fringe peak can be retrieved more accurately by making a polynomial fit around the discrete values of the envelope peak or that of the fringe peak; and 7—Calculate the corresponding temperature using the peak position resulting from Step 6 and the sensor calibration data.

For those skilled in the art, the above signal processing method used to implement the dispersion compensation correction and to extract the envelope or fringe peak location is just one method among other alternative ones. For example, all the steps of the above method that are performed in the frequency domain have their equivalent in the time domain using, for example, well-known FIR filtering techniques.

Figure 8:
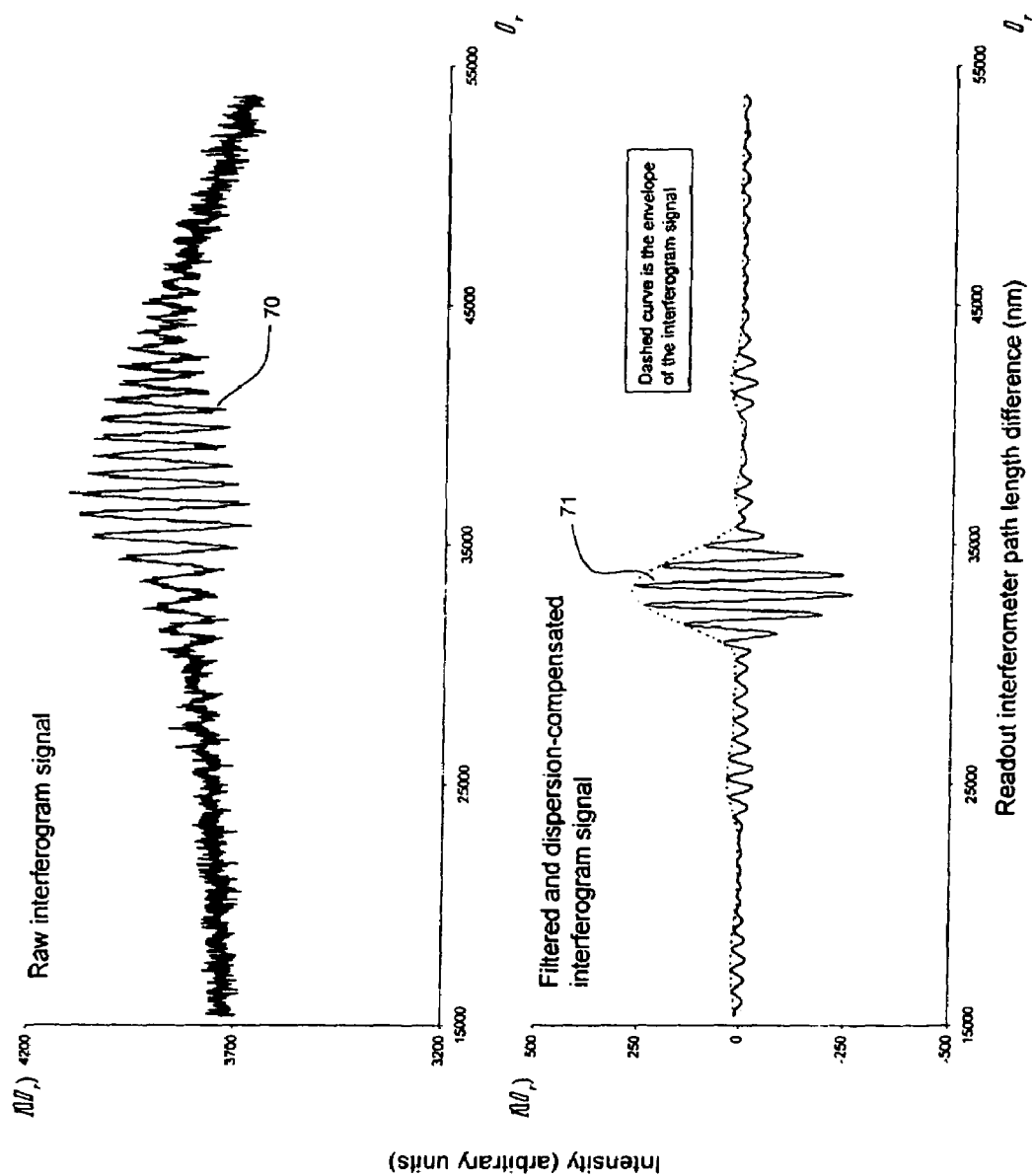
FIG. 8 is a graph showing experimental data obtained with a polarization-based readout interferometer made of $MgF_2$ crystal wedge and with a polarization-based temperature sensing interferometer made of a KNSBN crystal.

FIG. 8 shows experimental data obtained with a polarization-based readout interferometer made of MgF$_2$ crystal wedge and with a polarization-based temperature sensing interferometer made of a KNSBN crystal. The top graph curve 70 is the raw interferogram signal as read by the photodetector array. The bottom graph curve 71 is the filtered and dispersion compensated interferogram signal resulting from the signal processing method described before. This figure demonstrates the effect of our dispersion compensation and noise filtering method on the interferogram signal: from a wide-spread and noisy interferogram signal we obtain a smooth and well localized interferogram signal.

Figure 9:
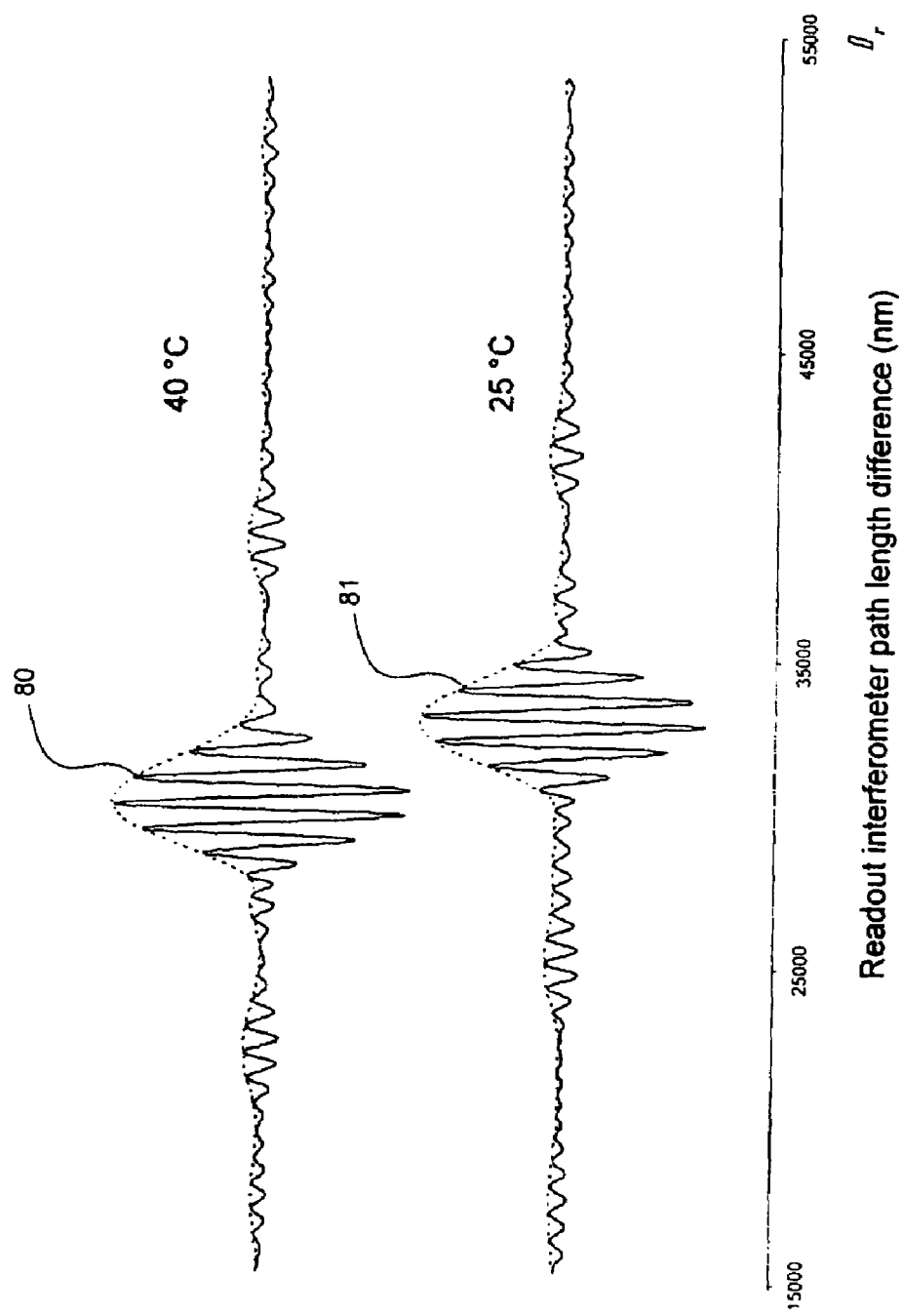
FIG. 9 is a graph showing experimental data obtained with a polarization-based readout interferometer made of $MgF_2$ crystal wedge and with a polarization-based temperature sensing interferometer made of a KNSBN crystal measured at two different sensed temperatures, the top curve showing data for a sensed temperature of 40° C. and the bottom curve showing data for a sensed temperature of 25° C.

FIG. 9 shows experimental data at two different temperatures obtained in the same manner as just described. The two graph curves 80 and 81 of the figure show that the envelope of the interferogram signal is preserved as the temperature changes One can also appreciate the high temperature sensitivity of the KNSBN-based temperature sensor.

The embodiments described above are intended to be exemplary only. The scope of the embodiments is therefore intended to be limited solely by the scope of the appended claims.

What is claimed is:

1. An LCI-based optical temperature sensing system comprising:
   a polarization-based sensing interferometer comprising an optical temperature sensing component having a temperature-dependent birefringence for providing a path length difference sensitive to a temperature to be measured, said sensing interferometer having a sensing dispersion;
   a readout interferometer optically coupled to said sensing interferometer and comprising one of a Fizeau interferometer made of an optical wedge and a polarization interferometer made of a birefringent wedge, said readout interferometer for providing a spatially distributed interferogram, said readout interferometer having a readout dispersion;
   an optical detection system for measuring said interferogram and for providing an interferogram signal; and
   a signal processing unit for numerically compensating an unbalanced dispersion on said interferogram signal resulting from a difference between said sensing dispersion and said readout dispersion.

2. The optical temperature sensing system as claimed in claim 1, wherein, in order to minimize dispersion imbalance effects in said interferogram, a value of said sensing dispersion is similar to a value of said readout dispersion.

3. The optical temperature sensing system as claimed in claim 1, wherein said signal processing unit is further for sampling said measured interferogram, for conditioning a resulting signal, for determining at least one of an envelope peak position and a fringe peak position, and for converting at least one of said envelope and fringe peak positions into a measurement of said path length difference to thereby provide said temperature measurement.

4. The optical temperature sensing system as claimed in claim 1,
   wherein said signal processing unit is
      for sampling said interferogram signal to provide a sampled signal;
      for taking a discrete Fourier transform of said sampled signal;
      for constructing a discrete phase function of said Fourier transform;
      for unwrapping said discrete phase function;
      for performing a polynomial fit on an unwrapped discrete phase function;
      for determining a slope of said polynomial fit; and
      for constructing a discrete phase-correction function to be used to numerically compensate said unbalanced dispersion.

5. The optical temperature sensing system as claimed in claim 4, wherein said signal processing unit further is
   for taking a discrete Fourier transform of said sampled signal;
   for selecting positive frequency components from said discrete Fourier transform;
   for filtering selected positive frequency components using a bandpass filter to provide a filtered positive frequency components;
   for applying said phase-correction function to said filtered positive frequency components to numerically compensate said unbalanced dispersion;
   for taking an inverse discrete Fourier transform of phase-corrected frequency components;
   for determining at least one of an envelope peak position and a fringe peak position; and
   for converting said at least one of said envelope and fringe peak positions into a measurement of said path length difference to thereby provide said temperature measurement.

6. The optical temperature sensing system as claimed in claim 1, wherein said optical temperature sensing component comprises a birefringent crystal.

7. The optical temperature sensing system as claimed in claim 6, wherein said sensing interferometer further comprises a polarizer and a mirror, said birefringent crystal being located therebetween.

8. The optical temperature sensing system as claimed in claim 6, wherein said sensing interferometer further comprises two polarizers, said birefringent crystal being located therebetween.

9. The optical temperature sensing system as claimed in claim 1, further comprising a light source for providing light to be propagated in said sensing interferometer, said light source comprising at least one of a filament light source and an electroluminescent diode.

10. The optical temperature sensing system as claimed in claim 1, wherein said one of a Fizeau interferometer made of an optical wedge and a polarization interferometer made of a birefringent wedge is said polarization interferometer and wherein said sensing component is a Potassium Sodium Strontium Barium Niobate (KNSBN) crystal and said birefringent wedge is a magnesium fluoride (MgF2) crystal.

11. The optical temperature sensing system as claimed in claim 1, further comprising an optical detection system for measuring said interferogram and providing an interferogram signal and wherein said optical detection system comprises a charge coupled device (CCD).

12. The optical temperature sensing system as claimed in claim 1, wherein, in order to minimize dispersion imbalance effects in said interferogram, a value of said sensing dispersion is similar to a value of said readout dispersion.

13. A method for optically sensing a temperature comprising:
   providing a LCI-based tandem interferometer setup having
      a polarization-based sensing interferometer comprising an optical temperature sensing component having a temperature-dependent birefringence for providing a path length difference sensitive to a temperature to be measured, said sensing interferometer having a birefringence dispersion; and a readout interferometer optically coupled to said sensing interferometer and comprising one of a Fizeau interferometer made of an optical wedge and a polarization interferometer made of a birefringent wedge, said readout interferometer for providing a spatially distributed interferogram, said readout interferometer having a readout dispersion;

propagating a light in said sensing interferometer, said light having a coherence length smaller than said path length difference;

measuring said interferogram;

numerically compensating an unbalanced dispersion resulting from a difference between said sensing dispersion and said readout dispersion on the measured interferogram for calculating a temperature measurement using the measured interferogram; and producing the temperature measurement.

14. The method as claimed in claim 13, wherein said calculating further comprises:

sampling said measured interterogram to provide a sampled signal;

conditioning said sampled signal to provide a conditioned signal;

determining at least one of an envelope peak position and a fringe peak position of said conditioned signal;

converting said at least one of said envelope and fringe peak positions into a measurement of said path length difference to thereby provide said temperature measurement.

15. The method as claimed in claim 14, wherein said numerically compensating comprises:

sampling said measured interferogram to provide a sampled signal;

taking a discrete Fourier transform of said sampled signal to provide a discrete Fourier transformed signal;

constructing a discrete phase function of said discrete Fourier transformed signal;

unwrapping said discrete phase function to provide an unwrapped discrete phase function;

performing a polynomial fit on said unwrapped discrete phase function;

determining a slope of said polynomial fit; and constructing a discrete phase-correction function to be used to numerically compensate said unbalanced dispersion.

16. The method as claimed in claim 15, wherein said numerically compensating further comprises:

taking a discrete Fourier transform of said sampled signal to provide a discrete Fourier transformed signal;

making all negative frequency components and zero frequency components of said discrete Fourier transformed signal equal to zero to provide a positive Fourier transformed signal;

filtering positive Fourier transformed signal using a bandpass filter to provide a filtered signal;

applying said phase-correction function to said filtered signal to numerically compensate said unbalanced dispersion to provide a corrected signal; and taking an inverse discrete Fourier transform of said corrected signal.

17. The method as claimed in claim 13, wherein said calculating further comprises noise digital filtering.

18. The method as claimed in claim 13, wherein said sensing component comprises a birefringent crystal.

19. The method as claimed in claim 13, wherein said one of a Fizeau interferometer made of an optical wedge and a polarization interferometer made of a birefringent wedge is said Fizeau interferometer.

20. The method as claimed in claim 13, wherein said one of a Fizeau interferometer made of an optical wedge and a polarization interferometer made of a birefringent wedge is said polarization interferometer.

21. A method for minimizing a dispersion effect on a temperature measurement made using LCI-based tandem interferometer setup in an optical temperature sensing system, said tandem interferometer comprising a sensing interferometer having an optical temperature sensing component having a temperature-dependent birefringence for providing a path length difference sensitive to a temperature to be measured, and a birefringence dispersion, hereinafter called a sensing dispersion; and a readout interferometer optically coupled to said sensing interferometer and having at least one of Fizeau interferometer made of an optical wedge having a material dispersion and a polarization interterometer made of a birefringent wedge having a birefringence dispersion, said material dispersion and said birefringence dispersion of said birefringent wedge hereinafter called a readout dispersion, said readout interferometer for providing a spatially distributed interferogram, the method comprising:

measuring said interferoram;

producing a temperature measurement by calculating said temperature measurement using the measured interferogram, said calculating comprising numerically compensating an unbalanced dispersion resulting from a difference between said sensing dispersion and said readout dispersion on the measured interferogram.

22. A tandem interferometer for temperature sensing comprising:

a LCI-based polarization-based sensing interferometer comprising an optical temperature sensing component having a temperature-dependent birefringence for providing a path length difference sensitive to a temperature to be measured and a birefringence dispersion, hereinafter called a sensing dispersion; and a readout interferometer optically coupled to said sensing interferometer and comprising one of a Fizeau interferometer made of an optical wedge having a material dispersion a polarization interferometer made of a birefringent wedge having a birefringence dispersion, said material dispersion and said birefringence dispersion of said birefringence wedge hereinafter called a readout dispersion, said readout interferometer for providing a spatially distributed interferogram;

an optical detection system for measuring said interferogram and for providing an interferogram signal;

a signal processing unit for numerically compensating an unbalanced dispersion on said interferogram signal resulting from a difference between said sensing dispersion and said readout dispersion.

23. An optical temperature sensing system comprising:

a LCI-based polarization-based sensing interferometer comprising an optical temperature sensing component having a temperature-dependent birefringence for providing a path length difference sensitive to a temperature to be measured and a sensing dispersion; and a readout interferometer optically coupled to said sensing interferometer and comprising one of a Fizeau interferometer made of an optical wedge and a polarization interferometer made of a birefringent wedge, said readout interferometer for providing a spatially distributed interferogram one of said optical wedge and said birefringent wedge having a readout dispersion;

a light source optically coupled to said sensing interferometer and for generating a light having a coherence length smaller than said path length difference;

an optical detection system for measuring said interferogram;

a signal processing unit for numerically compensating an unbalanced dispersion on said interferogram signal resulting from a difference between said sensing dispersion and said readout dispersion for providing a temperature measurement using a measured interferogram.

24. A method for numerically compensating a dispersion effect in an interferogram produced by a LCI-based tandem interferometer setup in an optical temperature sensing system, said tandem interferometer comprising a sensing interferometer having an optical temperature sensing component having a birefringent dispersion, hereinafter called a sensing dispersion and a temperature-dependent birefringence for providing a path length difference sensitive to a temperature to be measured; a readout interferometer optically coupled to said sensing interferometer and having one of a Fizeau interferometer made of an optical wedge having a material dispersion and a polarization interferometer made of a birefringent wedge having a readout dispersion, said readout interferometer for providing a spatially distributed interferogram; and an unbalanced dispersion resulting from a difference between said birefringent dispersion and said readout dispersion, the method comprising:

measuring said interferogram to provide an interferogram signal;

producing a temperature measurement by calculating said temperature measurement using the measured interferogram, said calculating comprising numerically compensating said unbalanced dispersion.

25. The method as claimed in claim 24, wherein said calculating further comprises:

sampling said interferogram signal to provide a sampled signal;

taking a discrete Fourier transform of said sampled signal to provide a discrete Fourier transformed signal;

constructing a discrete phase function of said discrete Fourier transformed signal;

unwrapping said discrete phase function to provide an unwrapped phase function;

performing a polynomial fit on said unwrapped phase function;

determining a slope of said polynomial fit; and constructing a discrete phase-correction function to be used to numerically compensate said dispersion effect.

26. The method as claimed in claim 25, wherein said numerically compensating further comprises:

taking a discrete Fourier transform of said sampled signal to provide a discrete Fourier transformed signal;

making all negative frequency components and zero frequency components of said discrete Fourier transformed signal equal to zero to provide a positive Fourier transformed signal;

filtering positive Fourier transformed signal using a band-pass filter to provide a filtered signal;

applying said phase-correction function to said filtered signal to numerically compensate said unbalanced dispersion to provide a corrected signal; and taking an inverse discrete Fourier transform of said corrected signal.

27. The method as claimed in claim 24, wherein said calculating further comprises:

determining at least one of an envelope peak position and a fringe peak position; and converting said at least one of said envelope and fringe peak positions into a measurement of said path length difference to thereby provide said temperature measurement.

28. An LCI-based optical temperature sensing system comprising:

a polarization-based sensing interferometer comprising an optical temperature sensing component having a temperature-dependent birefringence for providing a path length difference sensitive to a temperature to be measured, said sensing interferometer having a sensing dispersion;

a readout interferometer optically coupled to said sensing interferometer, said readout interferometer for providing a spatially distributed interferogram, said readout interferometer having a readout dispersion;

an optical detection system for measuring said interferogram and for providing an interferogram signal; and a signal processing unit for numerically compensating an unbalanced dispersion on said interferogram signal resulting from a difference between said sensing dispersion and said readout dispersion.

* * * * *

UNITED STATES PATENT AND TRADEMARK OFFICE
CERTIFICATE OF CORRECTION

PATENT NO. : 7,265,847 B2
APPLICATION NO. : 11/333203
DATED : September 4, 2007
INVENTOR(S) : Gaetan Duplain et al.

It is certified that error appears in the above-identified patent and that said Letters Patent is hereby corrected as shown below:

Column 16, line 36 claim 8 "interterometer" should be changed to --interferometer--.
Column 17, line 22 claim 14 "interterogram" should be changed to --interferogram--.
Column 18, line 18 claim 21 remove "at least --" in "having at least one of Fizeau";
        line 20 claim 21 "interterometer" should be changed to --interferometer--;
        line 27 claim 21 "interferoram" should be changed to --interferogram--;
        line 45 claim 22 insert --and-- between "dispersion --and-- a polarization";
        line 48 claim 22 "birefringence" should be changed to --birefringent--.
Column 19, line 1 claim 23 insert a comma between "interferogram" and "one".

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,265,847 B2
APPLICATION NO. : 11/333203
DATED : September 4, 2007
INVENTOR(S) : Gaetan Duplain et al.

It is certified that error appears in the above-identified patent and that said Letters Patent is hereby corrected as shown below:

Column 16, line 36 claim 8 "interterometer" should be changed to --interferometer--.
Column 17, line 22 claim 14 "interterogram" should be changed to --interferogram--.
Column 18, line 18 claim 21 remove "at least --" in "having at least one of Fizeau;
    line 20 "interterometer" should be changed to --interferometer--;
    line 27 "interferoram" should be changed to --interferogram--;
    line 45 insert --and-- between "dispersion --and-- a polarization";
    line 48 "birefringence" should be changed to --birefringent--.
Column 19, line 1 claim 23 insert a comma between "interferogram" and "one".

Signed and Sealed this

Twenty-fifth Day of March, 2008

JON W. DUDAS
*Director of the United States Patent and Trademark Office*